(12) United States Patent
Matsunaga et al.

(10) Patent No.: US 6,398,371 B1
(45) Date of Patent: Jun. 4, 2002

(54) ANTIGLARE FILM, METHOD FOR PRODUCING THE SAME, POLARIZER AND LIQUID CRYSTAL DISPLAY

(75) Inventors: Naohiro Matsunaga; Kazuhiro Nakamura, both of Kanagawa (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 0 days.

(21) Appl. No.: 09/945,744

(22) Filed: Sep. 5, 2001

(30) Foreign Application Priority Data

Sep. 22, 2000 (JP) ........................................ 2000-288785
Nov. 15, 2000 (JP) ........................................ 2000-348308

(51) Int. Cl.$^7$ ............................................... G02B 27/00
(52) U.S. Cl. .................... 359/614; 359/613; 359/610; 359/599
(58) Field of Search ............................... 359/614, 613, 359/601, 599, 608, 581, 582, 584, 586, 589, 580, 483, 485, 493; 428/323, 206, 327, 212

(56) References Cited

U.S. PATENT DOCUMENTS 6,064,524 A * 5/2000 Oka et al. .................... 359/582
6,074,741 A * 6/2000 Murata et al. .............. 428/327

* cited by examiner

*Primary Examiner*—Mohammad Sikder
(74) *Attorney, Agent, or Firm*—Burns, Doane, Swecker & Mathis, LLP (57) ABSTRACT

An antiglare film is described, which comprises a triacetyl cellulose transparent support having provided thereon one or more hard coat layers including an antiglare hard coat layer, wherein the hard coat layer contiguous to the triacetyl cellulose transparent support is formed from a coating solution comprising solvents comprising one or more solvents which dissolve the triacetyl cellulose support and one or more solvents which do not dissolve the triacetyl cellulose support. A method for producing the antiglare film, a polarizer wherein the antiglare film is used and a liquid crystal display wherein the antiglare film or the polarizer is used are also described.

23 Claims, 2 Drawing Sheets

ANTIGLARE FILM, METHOD FOR PRODUCING THE SAME, POLARIZER AND LIQUID CRYSTAL DISPLAY

FIELD OF THE INVENTION

The present invention relates to an antiglare film, a method for producing the same, a polarizer and a liquid crystal display using the same.

BACKGROUND OF THE INVENTION

In image displays such as CRT, PDP and LCD, an antiglare film or an antiglare antireflection film is generally arranged at outermost surface of a display for the purpose of preventing the reduction of contrast due to the reflection of an outer light and the reflection of an image.

The particles of an inorganic or organic polymer are used in a coating solution for forming the antiglare hard coat layer of an antiglare film or an antiglare antireflection film for giving an antiglare property. When a solvent which swells and dissolves a triacetyl cellulose support is used as a solvent composition in a coating solution for the antiglare hard coat layer for obtaining adhesion of the triacetyl cellulose support and the antiglare hard coat layer, the particles for giving antiglare property are partially buried in the support, thus a sufficient antiglare property cannot be obtained. While when a coating solution for the antiglare hard coat layer is prepared with a solvent which does not dissolve a triacetyl cellulose support, sufficient adhesion cannot be obtained, although antiglare property can be obtained, so that there arises a problem in either case.

SUMMARY OF THE INVENTION

An object of the present invention is to provide an antiglare film having sufficient antiglare property compatible with sufficient adhesion of a support and an antiglare hard coat layer by merely forming an antiglare hard coat layer on a triacetyl cellulose transparent support, further to provide an antiglare film having an antireflection ability by providing a low refractive index layer.

Another object of the present invention is to provide a polarizer and a liquid crystal display using the above film.

The above objects of the present invention have been achieved by an antiglare film, a polarizer and a liquid crystal display each having the constitution described below.

1. An antiglare film comprising a triacetyl cellulose transparent support having provided thereon one or more hard coat layers including an antiglare hard coat layer, wherein the hard coat layer contiguous to the triacetyl cellulose transparent support is formed from a coating solution comprising solvents comprising one or more solvents which dissolve the triacetyl cellulose support and one or more solvents which do not dissolve the triacetyl cellulose support.
2. The antiglare film as described in the above item 1, wherein at least one of the solvents which do not dissolve the triacetyl cellulose support has higher boiling point than the boiling point of at least one of the solvents which dissolve the triacetyl cellulose support.
3. The antiglare film as described in the above item 2, wherein the temperature difference of the boiling point between the solvent having the highest boiling point of the solvents which do not dissolve the triacetyl cellulose support and the solvent having the highest boiling point of the solvents which dissolve the triacetyl cellulose support is 30° C. or more.
4. The antiglare film as described in the above item 1, 2 or 3, wherein the antiglare hard coat layer is formed by crosslinking by ionizing radiation.
5. The antiglare film as described in the above item 1, 2, 3 or 4, wherein a penta-functional or more functional acrylate monomer which is crosslinked by ionizing radiation is at least used as the component for forming the antiglare hard coat layer.
6. The antiglare film as described in any of the above items 1 to 5, wherein the triacetyl cellulose transparent support is a triacetyl cellulose film formed by casting a triacetyl cellulose dope prepared by dissolving a triacetyl cellulose in a solvent not substantially containing a dichloromethane by means of a single layer-casting process.
7. The antiglare film as described in any of the above items 1 to 5, wherein the triacetyl cellulose transparent support is a triacetyl cellulose film formed by casting a triacetyl cellulose dope prepared by dissolving a triacetyl cellulose in a solvent by means of a multilayer-casting process.
8. The antiglare film as described in any of the above items 1 to 7, wherein particles having an average particle size of from 1.0 to 5.0 μm are dispersed in the antiglare hard coat layer.
9. The antiglare film as described in the above item 8, wherein the particles dispersed in the antiglare hard coat layer are spherical organic polymer particles.
10. The antiglare film as described in any of the above items 1 to 9, wherein the antiglare hard coat layer has a refractive index of from 1.50 to 2.00.
11. The antiglare film as described in any of the above items 1 to 10, wherein the antiglare hard coat layer comprises a cured product of the composition containing a monomer having two or more ethylenic unsaturated groups and the particles of the oxide of at least one kind of a metal selected from the group consisting of titanium, aluminum, indium, zinc, tin, antimony and zirconium having particle size of 0.1 μm or less.
12. The antiglare film as described in any of the above items 1 to 11, wherein a low refractive index layer having a refractive index of from 1.35 to 1.45 is provided as an antireflection layer as an outermost layer on the side of the support on which at least one hard coat layer is provided, and the haze value of the antiglare film is 3.0% or more.
13. The antiglare film as described in the above item 12, wherein the low refractive index layer comprises a cured product of the composition comprising a fluorine-containing compound which is crosslinked by heat or ionizing radiation and inorganic fine particles, and the integrating sphere average reflectance of from 450 to 650 nm of the antiglare film is 2.3% or less.
14. The antiglare film as described in the above item 13, wherein the inorganic fine particles have an average particle size of from 0.001 to 0.1 μm.
15. The antiglare film as described in the above item 13 or 14, wherein the inorganic fine particles are silica.
16. The antiglare film as described in the above item 13, 14 or 15, wherein the fluorine-containing compound is a polymer obtained by polymerizing a fluorine-containing vinyl monomer.
17. The antiglare film as described in any of the above items 1 to 16, wherein the triacetyl cellulose transparent support is a triacetyl cellulose formed by multilayer-casting of a triacetyl cellulose.
18. A method for producing an antiglare film comprising a triacetyl cellulose transparent support having provided thereon one or more hard coat layers including an antiglare hard coat layer, wherein the hard coat layer contiguous to said triacetyl cellulose transparent support is formed from a coating solution comprising solvents comprising one or more solvents which dissolve said triacetyl cellulose support and one or more solvents which do not dissolve said triacetyl cellulose support.

19. The method for producing an antiglare film as described in the above item 18, wherein at least one of the solvents which do not dissolve the triacetyl cellulose support has higher boiling point than the boiling point of at least one of the solvents which dissolve the triacetyl cellulose support.

20. The method for producing an antiglare film as described in the above item 19, wherein the temperature difference of the boiling point between the solvent having the highest boiling point of the solvents which do not dissolve the triacetyl cellulose support and the solvent having the highest boiling point of the solvents which dissolve the triacetyl cellulose support is 30° C. or more.

21. The method for producing an antiglare film as described in the above item 18, 19 or 20, wherein the antiglare hard coat layer is formed by crosslinking by ionizing radiation.

22. The method for producing an antiglare film as described in the above item 18, 19, 20 or 21, wherein a pentafunctional or more functional acrylate monomer which is crosslinked by ionizing radiation is at least used as the component for forming the antiglare hard coat layer.

23. The method for producing an antiglare film as described in any of the above items 18 to 22, wherein said triacetyl cellulose transparent support is a triacetyl cellulose film formed by casting a triacetyl cellulose dope prepared by dissolving a triacetyl cellulose in a solvent not substantially containing a dichloromethane by means of a single layer-casting process.

24. The method for producing an antiglare film as described in any of the above items 18 to 22, wherein said triacetyl cellulose transparent support is a triacetyl cellulose film formed by casting a triacetyl cellulose dope prepared by dissolving a triacetyl cellulose in a solvent by means of a multilayer-casting process.

25. The method for producing an antiglare film as described in any of the above items 18 to 24, wherein particles having an average particle size of from 1.0 to 5.0 μm are dispersed in the antiglare hard coat layer.

26. The method for producing an antiglare film as described in any of the above items 18 to 25, wherein said antiglare hard coat layer has a refractive index of from 1.50 to 2.00.

27. A polarizer, wherein the antiglare film as described in any of the above items 1 to 17 is used as at least one of two protective films of a polarizing layer.

28. A polarizer, wherein the antiglare film as described in any of the above items 1 to 17 is used as one of two protective films of a polarizing layer and an optical compensating film having optical anisotropy is used as the other protective film.

29. A liquid crystal display, wherein the antiglare film as described in any of the above items 1 to 17 or the polarizer as described in the above item 27 or 28 is used as the outermost layer of the display.

KEY TO THE SYMBOLS

1: Antiglare film
2: Transparent support
3: Antiglare hard coat layer
4: Low refractive index layer
5: Mat particles
6: Polarizing layer
7: Polarizer
8: Protective film.

DETAILED DESCRIPTION OF THE INVENTION

The antiglare film of the present invention comprises a triacetyl cellulose transparent support having provided thereon one or more hard coat layers including an antiglare hard coat layer, and a low refractive index layer is further provided when antireflection function is required of the antiglare film.

The fundamental constitution of the antiglare film of the present invention is described below with reference to the accompanying drawing.

Figure 1:
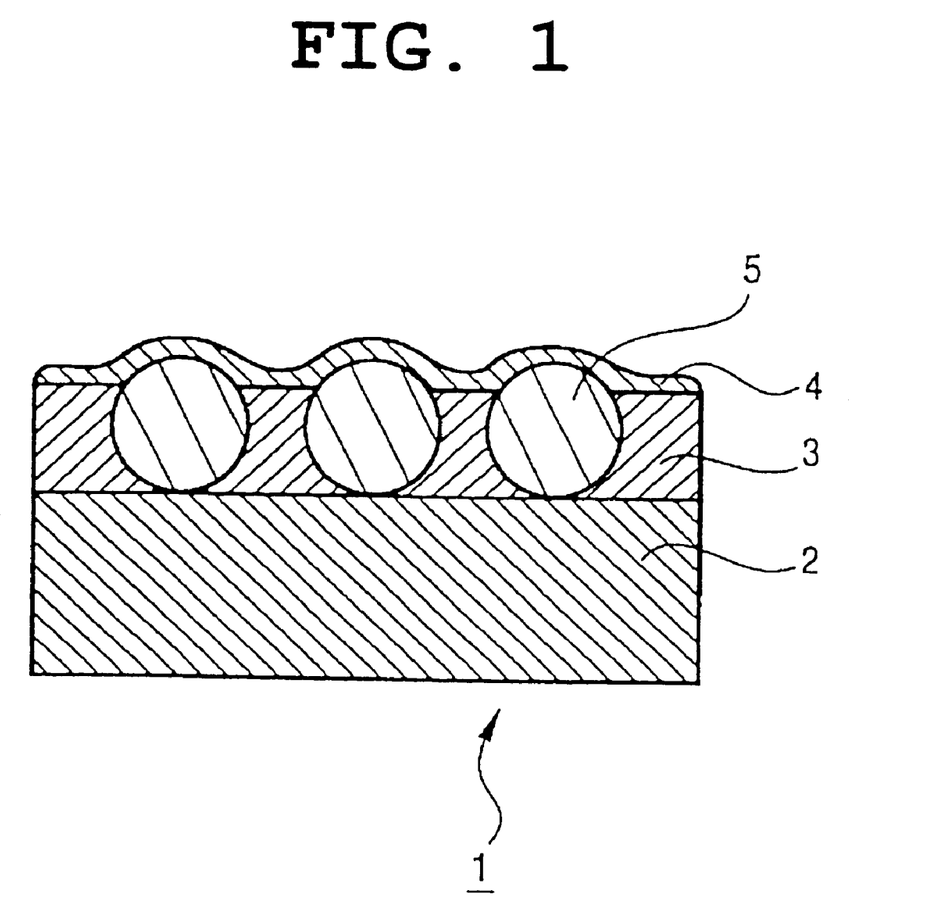
FIG. 1 is a schematic cross-sectional view showing the layer constitution of an antiglare antireflection film.

The embodiment shown in FIG. 1 is an example of an antiglare film of the present invention. Antiglare film 1 has the layer constitution in order of transparent support 2 comprising a triacetyl cellulose, antiglare hard coat layer 3, and low refractive index layer 4. Mat particles 5 are dispersed in antiglare hard coat layer 3. Antiglare hard coat layer 3 may comprises a plurality of layers. Further, a hard coat layer not having an antiglare property (not shown in the figure) may be coated for giving film strength, although it is not always necessary.

"Hard coat layer" used in the present invention includes both an antiglare hard coat layer and a hard coat layer not having an antiglare property.

The refractive index of the above antiglare hard coat layer is preferably from 1.50 to 2.00, and the refractive index of the low refractive index layer is preferably from 1.35 to 1.45. The refractive index of the triacetyl cellulose used as the transparent support is 1.48.

The antiglare film of the present invention preferably has a haze value of 3% or more (more preferably from 3 to 15%). An antiglare property and a haze value do not necessarily correspond linearly, but if a haze value is smaller than 3%, an antiglare film having sufficient antiglare property cannot be obtained. On the other hand, if a haze value is excessively large, light scattering on the surface or in the inside of the film is strong, as a result, problems such as the reduction of clarity and whitening of images arise, thus not advantageous.

Each layer constituting the antiglare film of the present invention is described below.

Support

A transparent support for use in the antiglare antireflection film according to the present invention is a triacetyl cellulose support (having a refractive index of 1.48), more preferably a triacetyl cellulose support comprising a plurality of layers.

When the antiglare film of the present invention is used in a liquid crystal display, the antiglare film is arranged at the outermost surface of a liquid crystal display by the way of providing an adhesive layer on one side, etc. Since a triacetyl cellulose is used as a protective film for protecting the polarizing layer of a polarizer, the antiglare film of the present invention using a triacetyl cellulose as a support can be used as a protective film as it is, and very advantageous economically.

As the transparent support of the antiglare film of the present invention, it is preferred to use a triacetyl cellulose film formed by any of a single layer-casting process or a multilayer-casting process of co-casting a triacetyl cellulose dope having been prepared by dissolving a triacetyl cellulose in a solvent. In particular, from the viewpoint of environmental protection, a triacetyl cellulose film formed using a triacetyl cellulose dope prepared by dissolving a triacetyl cellulose in a solvent not substantially containing a dichloromethane by a low temperature dissolution method or a high temperature dissolution method is preferably used.

A single layer triacetyl cellulose film is formed by a drum-casting process or a band-casting process as disclosed in JP-A-7-11055 (the term "JP-A" as used herein means an "unexamined published Japanese patent application") and a multilayer triacetyl cellulose film comprising a plurality of layers is formed by a co-casting process as disclosed in JP-A-61-94725 and JP-B-62-43846 (the term "JP-B" as used herein means an "examined Japanese patent publication"). That is, raw material flakes are dissolved with a solvent, and to the solution are added various additives, e.g., a plasticizer, an ultraviolet absorber, a degradation preventing agent, a sliding agent, and a peeling accelerator, as required, and then the solution (this is called a dope) is cast on a support consisting of a horizontal endless metal belt or a rotating drum by a dope supplying means. At this time, if the casting is single layer-casting, a single dope is cast as a single layer, and when the casting is multilayer casting, a dope in low concentration is cast on both sides of a cellulose ester dope in high concentration by co-casting, the cast solution is dried on the support to a certain degree, the film given stiffness is peeled from the support, and then the film is passed through a drying zone by various transporting means to remove the solvent.

Triacetyl cellulose films produced by a co-casting process are characterized in that they are excellent in film surface smoothness and productivity, since a dope in low concentration is cast on both sides of a cellulose ester dope in high concentration by co-casting. By using such supports, streaky coating unevenness attributable to the plane failure of a support caused at the time of wet coating of an antiglare layer of the antiglare antireflection film according to the present invention can be remarkably improved, thus an antiglare antireflection film in which excellent transmission image clarity is compatible with uniform plane properties at wet coating can be obtained.

Further, notwithstanding a triacetyl cellulose film produced by a co-casting process comprises a plurality of layers, a clear interface is not present between each layer and the layers form a continuous layer with each other, thus optical loss due to reflection and the like at interface does not occur.

Further, a triacetyl cellulose film produced by a co-casting process is improved especially in surface unevenness in the transverse direction, hence the improving effect of coating unevenness in the transverse direction is great when the upper layer is formed by wet coating. Evaluation of such smoothness in the transverse direction can be performed about the surface unevenness of each pitch constituent in a wide measuring range (from several centimeters to about 10 cm) by measuring surface displacement with a laser displacement gauge. As a result of similar evaluation of triacetyl cellulose films prepared in various methods, it has become clear that the failure in surface properties, in particular, streaky failure which occurs in the machine direction when an antiglare hard coat layer and a low refractive index layer are provided, is related with the height of the surface unevenness of from 3 to 10 mm pitch.

A support having a low height of the surface unevenness of from 3 to 10 mm pitch can be obtained by the above-described methods, and an antiglare antireflection film which hardly causes fault of surface properties such as streaky failure can be obtained by forming an antiglare layer and a low refractive index layer in order.

As the solvent for dissolving the triacetyl cellulose as described above, a dichloromethane is representative. A hydrocarbon halide such as a dichloromethane can be used with no problem technically, however, from the viewpoint of the global environmental protection and work environment, it is preferred that the solvent does not substantially contain a hydrocarbon halide such as dichloromethane. The terminology "does not substantially contain" means that the ratio of a hydrocarbon halide contained in the organic solvent is less than 5 wt % (preferably less than 2 wt %). In particular, it is preferred that a dichloromethane is not substantially contained in the solvent in the case of a single layer-casting process. In the case of a co-casting process, even if a dope using the solvent substantially containing a dichloromethane is cast by a multilayer co-casting process, since a dope containing a triacetyl cellulose in higher concentration as compared with the outer cast layers can be used as the inner cast layer, as a result, the amount of a dichloromethane released to the air can be reduced. In the present invention, it is preferred not to contain a hydrocarbon halide such as a dichloromethane even in the case of a co-casting process. Further, it is possible to increase a casting speed of a co-casting process, thus a co-casting process is excellent in productivity too.

When a triacetyl cellulose dope is prepared by using a solvent not substantially containing a dichloromethane or the like, the peculiar dissolution methods described below are essential.

A first dissolution method which is called a cooling dissolution method is described below. In the first place, a triacetyl cellulose is gradually added to a solvent with stirring at a temperature around room temperature (from −10 to 40° C.). In the next place, the mixed product is cooled to from −100 to −10° C. (preferably from −80 to −10° C., more preferably from −50 to −20° C., and most preferably from −50 to −30° C.) Refrigeration can be performed in a dry icemethanol bath (−75° C.) or a refrigerated diethylene glycol solution (from −30 to −20° C.). The mixed product of a triacetyl cellulose and a solvent is solidified by refrigeration. Further, when this solid product is heated to from 0 to 200° C. (preferably from 0 to 150° C., more preferably from 0 to 120° C., and most preferably from 0 to 50° C.), the solid product comes to a solution wherein triacetyl cellulose is flowing in the solvent. The temperature increase may be performed by merely allowing the solid product to stand in room temperature or the solid product may be heated in a hot bath.

A second dissolution method which is called a high temperature dissolution method is described below. In the first place, a triacetyl cellulose is gradually added to a solvent with stirring at a temperature around room temperature (from −10 to 40° C.). It is preferred that the triacetyl cellulose solution according to the present invention comprises a mixed solvent containing various solvents and a triacetyl cellulose added thereto and swelled in advance. The concentration of the triacetyl cellulose solution in this method is preferably 30 wt % or less, but in view of the drying efficiency at film-forming time, the concentration of the triacetyl cellulose solution is preferably as high as possible. In the next place, the mixed solution of organic solvents is heated at from 70 to 240° C. (preferably from 80 to 220° C., more preferably from 100 to 200° C., and most preferably from 100 to 190° C.) under pressure of from 0.2 to 30 PMa. Since the heated solution cannot be coated as it is, it is necessary that the solution should be cooled to not higher than the lowest boiling point of the solvents used. In such a case, the solution is generally cooled to −10 to 50° C. and then returned to normal pressure. A high pressure and high temperature container or line in which the triacetyl cellulose solution is contained may be merely allowed to stand at room temperature to effect refrigeration, or more preferably the container and line may be refrigerated with a cooling medium such as cooling water.

When the antiglare film of the present invention is used in a liquid crystal display, the antiglare film is arranged at the outermost surface of the liquid crystal display by the way of providing an adhesive layer on one side of the film, etc. Since a triacetyl cellulose film is used as a protective film for protecting the polarizing layer of a polarizer in a liquid crystal display, the antiglare film of the present invention can be used as a protective film as it is, therefore very preferred.

For using the antiglare film of the present invention as the protective film of a polarizing layer, it is necessary that the protective film is subjected to saponification treatment from the viewpoint of adhesive property. Since the antiglare film of the present invention is resistant to saponification, the film can undergo saponification treatment just before being stuck on the protective film. Saponification treatment may be performed directly to the triacetyl cellulose film or may be performed after an antiglare hard coat layer has been formed, but it is preferably performed after the layer has been entirely formed from the point of productivity.

Antiglare Hard Coat Layer

An antiglare hard coat layer is a layer for giving an antiglare property to the antiglare film of the present invention, and mat particles are dispersed in a high refractive index material.

The refractive index of an antiglare hard coat layer is preferably from 1.50 to 2.00, more preferably from 1.57 to 1.90, and still more preferably from 1.64 to 1.80. The refractive index of the antiglare hard coat layer is a value measured in the state not containing mat particles.

An antireflection property lowers when a refractive index is too small, while when it is too large, the tint of the reflected light of the antiglare film of the present invention becomes strong, which is not preferred.

Further, since light scattering attributable to surface unevenness due to mat particles dispersed in a high refractive index material is caused in the antiglare hard coat layer, the influence of optical interference is not caused in the antiglare layer. In a hard coat layer having high refractive index not containing mat particles, an amplitude large in reflectance is seen in the wavelength dependency of reflectance by the optical interference due to the difference in the refractive index between a hard coat layer and a support, as a result, the effect of preventing reflection is deteriorated and, at the same time, color unevenness comes to occur. However, in the antiglare film of the present invention, these problems are solved by the scattering effect by the surface unevenness of the antiglare layer.

The binder for use in the antiglare hard coat layer is preferably a polymer having a saturated hydrocarbon or a polyether as the main chain, and a polymer having a saturated hydrocarbon as the main chain is more preferred. Further, a binder is preferably crosslinked. It is preferred to obtain a polymer having a saturated hydrocarbon as the main chain by the polymerization reaction of an ethylenic unsaturated monomer. For obtaining a crosslinked binder, it is preferred to use a monomer having two or more ethylenic unsaturated groups.

The examples of the monomers having two or more ethylenic unsaturated groups include esters of polyhydric alcohol and (meth)acrylic acid (e.g., ethylene glycol di(meth)acrylate, 1,4-cyclohexane diacrylate, pentaerythritol tetra(meth)acrylate, pentaerythritol tri(meth)acrylate, trimethylolpropane tri(meth)acrylate, trimethylolethane tri(meth)acrylate, dipentaerythritol tetra(meth)acrylate, dipentaerythritol penta(meth)acrylate, dipentaerythritol hexa(meth)acrylate, 1,3,5-cyclohexanetriol trimethacrylate, polyurethane polyacrylate, and polyester polyacrylate), vinylbenzene derivatives (e.g., 1,4-divinylbenzene, 4-vinylbenzoic acid-2-acryloyl ethyl ester, and 1,4-divinylcyclohexanone), vinyl sulfone (e.g., divinyl sulfone), acrylamide (e.g., methylenebisacrylamide) and methacrylamide. Of these monomers, penta-functional or more acrylates are preferred from the viewpoint of film hardness, i.e., scratch resistance. The mixtures of dipentaerythritol pentaacrylate and dipentaerythritol hexaacrylate are commercially available and particularly preferably used.

These monomers having an ethylenic unsaturated group are dissolved in a solvent with various kinds of polymerization initiators and other additives, coated and dried, and then cured by ionizing radiation or thermal polymerization reaction.

In place of or in addition to the monomers having two or more ethylenic unsaturated groups, crosslinking structure may be introduced into a binder by the reaction of a crosslinkable group. The examples of crosslinkable functional groups include an isocyanate group, an epoxy group, an aziridine group, an oxazoline group, an aldehyde group, a carbonyl group, a hydrazine group, a carboxyl group, a methylol group and an active methylene group. Vinylsulfonic acid, acid anhydride, cyanoacrylate derivative, melamine, etherified methylol, ester and urethane, and metal alkoxide such as tetramethoxysilane can be used as the monomers for introducing crosslinking structure. Functional groups which show a crosslinking property as a result of decomposition reaction, e.g., a blocked isocyanate group, may also be used, i.e., crosslinking functional groups which show reactivity as a result of decomposition may be used in the present invention even if they do not show reactivity in a moment.

The binders having these crosslinkable functional groups can form crosslinking structure by heating after coating.

In addition to the above binder polymers, the binder of the antiglare hard coat layer is formed from the polymers obtained by the copolymerization of the above binder polymer and a monomer having a high refractive index and/or metal oxide ultra fine particles having a high refractive index, etc.

The examples of monomers having a high refractive index include bis(4-methacryloylthiophenyl)sulfide, vinylnaphthalene, vinylphenyl sulfide, 4-methacryloxyphenyl-4'-methoxyphenyl thioether, etc.

It is preferred for the metal oxide ultra fine particles having a high refractive index to contain fine particles having a particle size of 100 nm or less, preferably 50 nm or less, comprising at least one oxide of metal selected from the group consisting of zirconium, titanium, aluminum, indium, zinc, tin and antimony. As the examples of the fine particles, $ZrO_2$, $TiO_2$, $Al_2O_3$, $In_2O_3$, $ZnO$, $SnO_2$, $Sb_2O_3$ and ITO, and $ZrO_2$ is especially preferred of these.

The addition amount of the metal oxide ultra fine particles is preferably from 10 to 90 wt %, more preferably from 20 to 80 wt %, of the entire weight of the antiglare hard coat layer.

For the purpose of imparting an antiglare property and preventing the deterioration of reflectance due to the interference by the hard coat layer and a support, and for preventing irregular color, inorganic or organic polymer particles are dispersed in the antiglare hard coat layer as the mat particles. The shape of the mat particles is not especially restricted but a perfect spherical shape is preferred for giving a uniform antiglare property. Further, from the viewpoint of the dispersion stability of the particles in a coating solution, organic polymer particles are more preferred. The average particle size of the mat particles is preferably from 1.0 to 5.0 µm, more preferably from 1.5 to 4.0 µm, and still more preferably from 2.0 to 3.0 µm, in number average particle size by a Coulter method. If the average particle size is less than 1.0 µm, an antiglare property is insufficient and if it exceeds 5.0 µm, transmission image clarity is deteriorated.

As the mat particles for use in the antiglare hard coat layer, amorphous silica particles, crosslinked PMMA series particles, crosslinked polystyrene series particles, and crosslinked benzoguanamine series particles are preferably used from the viewpoint of an average particle size, a refractive index, and easiness of dispersion. Of these, spherical organic polymer particles are particularly preferred.

When the antiglare hard coat layer is in contact with the support, the solvents for the coating solution for forming the antiglare hard coat layer comprise one or more solvents which dissolve the triacetyl cellulose support and one or more solvents which do not dissolve the triacetyl cellulose support for contriving to reconcile the exhibition of antiglare property and the adhesion of the support to the antiglare layer. More preferably, at least one of the solvents which do not dissolve the triacetyl cellulose support has higher boiling point than the boiling point of at least one of the solvents which dissolve the triacetyl cellulose support. Still more preferably, the temperature difference of the boiling point between the solvent having the highest boiling point of the solvents which do not dissolve the triacetyl cellulose support and the solvent having the highest boiling point of the solvents which dissolve the triacetyl cellulose support is 30° C. or more, and most preferably, the temperature difference is 50° C. or more.

As the solvents which dissolve a triacetyl cellulose, the following solvents can be exemplified: Ethers having from 3 to 12 carbon atoms, specifically, dibutyl ether, dimethoxymethane, dimethoxyethane, diethoxyethane, propylene oxide, 1,4-dioxane, 1,3-dioxolan, 1,3,5-trioxane, tetrahydrofuran, anisole, phenetole, etc.; Ketones having from 3 to 12 carbon atoms, specifically, acetone, methyl ethyl ketone, diethyl ketone, dipropyl ketone, diisobutyl ketone, cyclopentanone, cyclohexanone, methyl cyclohexanone, etc. Esters having from 3 to 12 carbon atoms, specifically, ethyl formate, propyl formate, n-pentyl formate, methyl acetate, ethyl acetate, methyl propionate, ethyl propionate, n-pentyl acetate, γ-butyrolactone, etc. Organic solvents having two or more functional groups, specifically, 2-methoxymethyl acetate, 2-ethoxymethyl acetate, 2-ethoxyethyl acetate, 2-ethoxyethyl propionate, 2-methoxyethanol, 2-propoxyethanol, 2-butoxyethanol, 1,2-diacetoxyacetone, acetylacetone, diacetone alcohol, methyl acetoacetate, ethyl acetoacetate, etc.

These solvents can be used alone or in combination of two or more.

As the solvents which do not dissolve triacetyl cellulose, methanol, ethanol, 1-propanol, 2-propanol, 1-butanol, 2-butanol, tert-butanol, 1-pentanol, 2-methyl-2-butanol, cyclohexanol, isobutyl acetate, methyl isobutyl ketone, 2-octanone, 2-pentanone, 2-hexanone, 2-heptanone, 3-pentanone, 3-heptanone, 4-heptanone can be exemplified.

These solvents can be used alone or in combination of two or more.

The weight ratio of the total amount of the solvents which dissolve triacetyl cellulose (A) to the total amount of the solvents which do not dissolve triacetyl cellulose (B) (A/B) is preferably from 5/95 to 50/50, more preferably from 10/90 to 40/60, and still more preferably from 15/85 to 30/70.

Hard Coat Layer Not Having Antiglare Property

In the antiglare film of the present invention, a hard coat layer not having an antiglare property may be coated between the transparent support and the antiglare layer, if necessary, for the purpose of improving film strength, but this layer is not an requisite layer.

The refractive index of the hard coat layer not having an antiglare property is preferably from 1.50 to 1.60.

The same components as the binder constituting the antiglare hard coat layer can be used in the hard coat layer not having an antiglare property except that mat particles are not dispersed therein, and the refractive index can be made to fall within the above range by the adjustment of the components.

When the hard coat layer not having an antiglare property is in contact with the support, the same meaning as to the solvents as described in the antiglare hard coat layer is applied as it is to the solvents for the coating solution for forming the hard coat layer not having an antiglare property.

Low Refractive Index Layer

A low refractive index layer is provided as the antireflection layer as the outermost layer on the side of the support on which the hard coat layer is provided for the purpose of giving an antireflection ability to the antiglare film of the present invention.

The refractive index of the low refractive index layer is preferably from 1.35 to 1.45.

It is preferred that the refractive index of the low refractive index layer should satisfy the following equation (I):

$$(m\lambda/4) \times 0.7 < n_1 d_1 < (m\lambda/4) \times 1.3 \qquad (I)$$

wherein m represents a positive odd number (generally 1), $n_1$ represents the refractive index of the low refractive index layer, and $d_1$ represents the film thickness of the low refractive index layer (nm). $\lambda$ represents the wavelength of a visible ray, and is the value in the range of from 450 to 650 nm.

Satisfying the above equation (I) means that m (a positive odd number, generally 1) which satisfies equation (I) in the above wavelength range is present.

A cured fluorine-containing resin of a heat curing type or ionizing radiation curing type crosslinkable fluorine-containing compound is used in the low refractive index layer. The coefficient of dynamic friction of a cured fluorine-containing resin is preferably from 0.03 to 0.15, and the contact angle to water is preferably from 90 to 120°.

As the crosslinkable fluorine-containing compound, silane compounds containing a perfluoroalkyl group, e.g., (heptadecafluoro-1,1,2,2-tetradecyl)triethoxysilane, and fluorine-containing copolymers containing a fluorine-containing monomer and a monomer for providing a crosslinking property as constitutional units can be exemplified.

The specific examples of the fluorine-containing monomers include, e.g., fluoroolefins (e.g., fluoroethylene, vinylidene fluoride, tetrafluoroethylene, hexafluoroethylene, hexafluoropropylene, perfluoro-2,2-dimethyl-1,3-dioxole, etc.), partially or completely fluorinated alkyl ester derivatives of (meth)acrylic acid (e.g., Biscote 6FM (manufactured by Osaka Yuki Kagaku Co., Ltd.), M-2020 (manufactured by Daikin Kogyo Co., Ltd.)), and completely or partially fluorinated vinyl ethers, etc.

As the monomers for providing a crosslinking property, (meth)acrylate monomers having a crosslinkable functional group in advance in the molecule, e.g., glycidyl methacrylate, (meth)acrylate monomers having a carboxyl group, a hydroxyl group, an amino group or a sulfonic acid group (e.g., (meth)acrylic acid, methylol (meth)acrylate, hydroxyalkyl (meth)acrylate, allyl acrylate, etc.) can be exemplified. In the latter case, crosslinking structure can be introduced after copolymerization as disclosed in JP-A-10-25388 and JP-A-10-147739.

Not only the above-described copolymers of a fluorine-containing monomer and a monomer for providing a crosslinking property but the polymers of these monomers copolymerized with other monomers may be used in the low refractive index layer.

Other monomers which may be copolymerized are not particularly restricted and, e.g., olefins (e.g., ethylene, propylene, isoprene, vinyl chloride, vinylidene chloride), acrylic esters (e.g., methyl acrylate, ethyl acrylate, 2-ethylhexyl acrylate), methacrylic esters (e.g., methyl methacrylate, ethyl methacrylate, butyl methacrylate, ethylene glycol dimethacrylate), styrene derivatives (e.g., styrene, divinylbenzene, vinyltoluene, α-methylstyrene), vinyl ethers (e.g., methyl vinyl ether), vinyl esters (e.g., vinyl acetate, vinyl propionate, vinyl cinnamate), acrylamides (e.g., N-tert-butylacrylamide, N-cyclohexylacrylamide), methacrylamides and acrylonitrile derivatives can be exemplified.

For giving a scratch resisting property, it is preferred that the ultra fine particles of an Si oxide having an average particle size of preferably 0.1 μm or less, more preferably from 0.001 to 0.05 μm, be added to the fluorine-containing resins for use in the low refractive index layer. In view of the prevention of reflection, the refractive index is preferably the lower, but as the refractive index of the fluorine-containing resin is lowered, the scratch resistance is deteriorated. Accordingly, the best balanced point of scratch resistance and low refractive index can be found by optimizing the refractive index of the fluorine-containing resin and the addition amount of the ultra fine particles of an Si oxide. As the ultra fine particles of an Si oxide, silica sols dispersed in commercially available organic solvents may be added to the coating solution as they are or various kinds of commercially available silica powders may be used by being dispersed in organic solvents.

Formation of Each Layer

Each layer of the antiglare film can be formed by coating according to various coating method, e.g., a dip coating method, an air knife coating method, a curtain coating method, a roller coating method, a wire bar coating method, a gravure coating method and an extrusion coating method (disclosed in U.S. Pat. No. 2,681,294). Two or more layers may be coated at the same time. Simultaneous coating methods are disclosed, e.g., in U.S. Pat. Nos. 2,761,791, 2,941,898, 3,508,947, 3,526,528 and Yuji Harazaki, *Coating Kogaku* (*Coating Engineering*), p. 253, Asakura Shoten Co. (1973).

Application to Liquid Crystal Display and Polarizer

Figure 2:
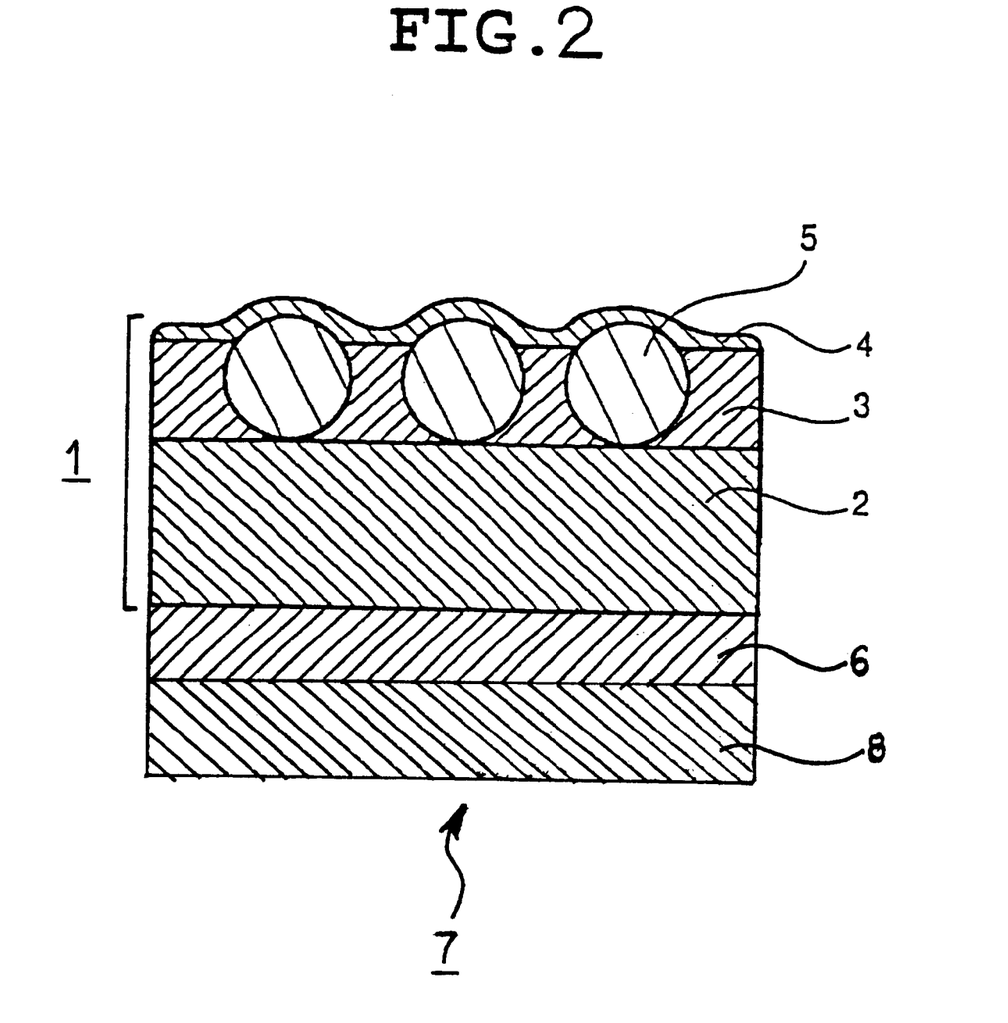
FIG. 2 is a schematic cross-sectional view showing the layer constitution of a polarizer which includes an antiglare antireflection film as shown in FIG. 1.

The antiglare film of the present invention can be applied to image displays, e.g., a liquid crystal display (LCD), a plasma display panel (PDP), an electroluminescence display (ELD) and a cathode ray tube (CRT). The antiglare film of the present invention is used by adhering the transparent support side of the film to the image displaying face of an image display, but when the antiglare film is used on the surface or in the inside of LCD, it is more preferred to use the film as it is as the film 1 of one side of the two protective films for protecting the polarizing layer 6 a polarizer 7 (FIG. 2). It is still more preferred to use an optical compensating film having optical anisotropy on the other side in view of its capability in providing the effect of widening the angle of visibility instead of a protective film 8.

In the antiglare film of the present invention, a sufficient antiglare property is compatible with sufficient adhesion of a support and an antiglare hard coat layer by merely forming an antiglare hard coat layer on a triacetyl cellulose transparent support. Further, a film comprising the antiglare film of the present invention provided with a low refractive index layer as the antireflection layer is possessed of not only an antiglare property but an antireflection ability.

Further, a polarizer and a liquid crystal display using the above film comprising the antiglare film of the present invention provided with a low refractive index layer as the antireflection layer are free of the reflection of an outer light, therefore excellent contrast can be obtained. The polarizer and the liquid crystal display are excellent in visibility and image clarity, because reflected images are inconspicuous due to the antiglare property.

The present invention is more specifically described below with referring to examples, but it should not be construed as the present invention is limited thereto.

EXAMPLE 1

Preparation of Triacetyl Cellulose Dope A

Starting materials comprising 17.4 weight parts of triacetyl cellulose, 2.6 weight parts of triphenyl phosphate, 66 weight parts of dichloromethane, 5.8 weight parts of methanol, and 8.2 weight parts of n-butanol were mixed with stirring and dissolved to prepare triacetyl cellulose dope A.

Preparation of Triacetyl Cellulose Dope B

Starting materials comprising 24 weight parts of triacetyl cellulose, 4 weight parts of triphenyl phosphate, 66 weight parts of dichloromethane, and 6 weight parts of methanol were mixed with stirring and dissolved to prepare triacetyl cellulose dope B.

Preparation of Triacetyl Cellulose Dope C

A heterogeneous gel state solution obtained by stirring 20 weight parts of triacetyl cellulose, 48 weight parts of methyl acetate, 20 weight parts of cyclohexanone, 5 weight parts of methanol, 5 weight parts of ethanol, 2 weight parts of triphenyl phosphate/biphenyldiphenyl phosphate (1/2), 0.1 weight part of silica (a particle size of 20 nm), and 0.2 weight part of 2,4-bis(n-octylthio)-6-(4-hydroxy-3,5-di-tert-butylanilino)-1,3,5-triazine was cooled at -70° C. for 6 hours, then heated at 50° C. and stirred to prepare triacetyl cellulose dope C.

Preparation of Triacetyl Cellulose Dope D

A heterogeneous gel state solution obtained in the same manner as in the preparation of triacetyl cellulose dope C was heated in a stainless steel sealed container at 1 MPa, 180° C. for 5 minutes, and then the container was put in a water bath at 50° C. to be cooled, thereby triacetyl cellulose dope D was prepared.

Preparation of Coating Solution for Antiglare Hard Coat Layer

As the binder constituting the antiglare hard coat layer, a mixture of dipentaerythritol pentaacrylate and dipentaerythritol hexaacrylate (DPHA, manufactured by Nippon Kayaku Co., Ltd.) was used. As the photopolymerization initiator, an appropriate amount of Irgacure 907 (manufactured by Ciba Fine Chemicals Co., Ltd.) was added. As the high refractive index material for imparting a high refractive index to the antiglare hard coat layer, zirconium oxide fine particles having a particle size of about 30 nm were dispersion-liquefied by a solvent and added to the coating solution of the antiglare hard coat layer. Further, as the spherical particles for imparting an antiglare property, Eposter MS (crosslinked benzoguanamine particles, average particle size: about 2 μm, the refractive index of the particles: 1.68, manufactured by Nippon Shokubai Co., Ltd.) was dispersion-liquefied by a solvent and added to the coating solution of the antiglare hard coat layer. The concentration of the coating solution of the antiglare hard coat layer containing the above solid contents was adjusted so that when the wet coating amount was 5.2 ml/m² the refractive index of the antiglare hard coat layer (the refractive index of the composite layer of the binder and the zirconium oxide) after being dried and UV-cured became 1.68, the film thickness 1.4 μm, and the haze 14% (related with the concentration of the particles). The solvent composition of the coating solution of the antiglare hard coat layer at this time was only methyl ethyl ketone (100%). The coating solution of the antiglare hard coat layer was filtered in advance before coating through a polypropylene filter (PPE-03) having a pore diameter of 3 μm.

Preparation of Coating Solution for Low Refractive Index Layer

To 2,240 g of a thermally crosslinkable fluorine-containing polymer (JN-7228, manufactured by JSR Co., Ltd., the concentration of the solid contents: 6 wt %, a methyl ethyl ketone solution) having a refractive index of 1.42 were added 192 g of MEK-ST (an average particle size: from 10 to 20 nm, a methyl ethyl ketone dispersion of an $SiO_2$ sol having the concentration of the solid contents of 30 wt %, manufactured by Nissan Chemical Industries, Ltd.), 2,224 g of a methyl ethyl ketone, and 144 g of cyclohexanone, stirred, and then the mixture was filtered through a polypropylene filter (PPE-01) having a pore diameter of 1 μm, thereby a coating solution for the low refractive index layer was prepared. When this coating solution is coated on the above antiglare hard coat layer having haze of 14%, the haze of the resulting coated layer finally becomes 12%.

Comparative Sample No. 1

The above coating solution for antiglare hard coat layer was coated on a triacetyl cellulose film (TAC-TD80U, manufactured by Fuji Photo Film Co., Ltd.) having a thickness of 80 μm by means of a bar coater and dried at 120° C., and then the coated layer was cured with the irradiation of ultraviolet using an air cooling type metal halide lamp (manufactured by I Graphics Co., Ltd.) having a capacity of 160 W/em at illuminance of 400 mW/cm² and the quantity of radiation of 300 mJ/cm², thus an antiglare hard coat layer having a thickness of 1.4 μm was formed.

The above coating solution for low refractive index layer was coated thereon with a bar coater and dried at 80° C., and subjected to crosslinking at 120° C. for 8 minutes, thereby a low refractive index layer having a thickness of 0.096 μm was formed.

Comparative Sample Nos. 2 to 12 and Sample Nos. 1 to 12 of the Invention

Comparative Sample Nos. 2 to 12 and Sample Nos. 1 to 12 of the invention were prepared in the same manner as in the preparation of Comparative Sample No. 1 except that the final coating solution solvent composition of the coating solution for the antiglare hard coat layer was changed as shown in Table 1 below.

Evaluation of Surface Displacement of Transparent Support

The smoothness of the transparent support prepared by each casting process was evaluated according to the following method.

Each transparent support was cut to a size of 170 mm×4 mm vertically to the casting direction, both ends of the support were fixed by being stuck on an acryl plate. A laser displacement gauge (KL130A, manufactured by Anritsu Co., Ltd.) was used for measuring surface displacement and a mask was provided on the laser ray-receiving part so that only the surface reflection could be measured on conditions of the measuring range of 135 mm and the measuring spacing of 100 μm. The surface displacement measured was taken in as the two dimensional coordinate data. In the next place, for removing the ingredients of undulation due to the flexure of the base film, the displacements up and down from the central line of the two dimensional coordinate data were described as plus and minus respectively with the central line of the two dimensional coordinate data as the curve fitted by a septuple formula, and the surface displacements of the film to respective positions were graphed. The height of the surface unevenness having a pitch of from 3 to 10 mm was read from the graph and the ratio of the height to the pitch was computed.

Evaluation of Antiglare Antireflection Film

Evaluation of the following each item was performed with the prepared antiglare antireflection film.

(1) Haze

The haze of the obtained film was measured using a haze meter MODEL 1001DP (manufactured by Nippon Denshoku Kogyo Co., Ltd.).

(2) Evaluation of Transmission Image Clarity

The value of the transmission image clarity of the prepared antiglare antireflection film was measured by an optical comb of 0.5 mm width using an image clarity tester model ICM-2D (manufactured by Suga Shikenki Co., Ltd.). It was found that the value of the transmission image clarity was an important indicator for developing an antiglare antireflection film matching a high-definition LCD monitor. The larger the value, it can be said that the film corresponds to high precision. The goal was set at 30% or more in the present invention.

(3) Evaluation of Antiglare Property

A bare fluorescent lamp with no louver (8,000 cd/cm²) was reflected on the antiglare antireflection film prepared, and the degree of a blur of the reflected image was evaluated by the following criteria.

⊚: The contour of the fluorescent lamp could not be recognized at all or hardly recognized.

○: The contour of the fluorescent lamp could be slightly recognized.

Δ: The fluorescent lamp was blurred but the contour could be recognized.

×: The fluorescent lamp was hardly blurred.

(4) Adhering Property

On the surface of the antiglare antireflection film, a 25 mm square portion was notched with a single edged blade to make 25 square portions (one square was 5 mm×5 mm), a commercially available cellophane adhesive tape was applied to the surface of the film with a load of 1 kg, and the adhesion was evaluated by whether the film was peeled or not with the cellophane tape when the cellophane tape was peeled. The test was repeated five times and the adhesion was evaluated by the following criteria.

⊚: The film did not peel off at all.

○: Less than one square peeled off on average.

Δ: From one to less than five squares peeled off on average.
×: Five or more squares peeled off on average.

The results of the comparative samples are shown in Table 1 and the results of the samples of the present invention are shown in Table 2 below.

As is shown in Table 1, when the solvent composition constituting the coating solution of the antiglare hard coat layer comprises only a solvent which does not dissolve the triacetyl cellulose support, there arises a problem in the adhesion.

While when the solvent composition comprises only a solvent which dissolves the triacetyl cellulose support, the particles for giving antiglare property are buried in the support dissolved, there arises a problem in that the antiglare property cannot be obtained.

On the other hand, as is apparent from the results shown in Table 2, the adhesion is compatible with the antiglare property when the solvent composition of the coating solution comprises both of the solvent dissolving the triacetyl cellulose support and the solvent not dissolving the triacetyl cellulose support. Further, when the boiling point of the solvent which does not dissolve the triacetyl cellulose support is higher than that of the solvent which dissolves the triacetyl cellulose support, and the larger the difference of the boiling points, the greater is the effect.

TABLE 1

| Comparative Sample | Solvent Composition of Antiglare Hard Coat Layer (wt %) | Solubility of TAC of Solvent | Boiling Point (° C.) | Antiglare Property | Adhesion |
|---|---|---|---|---|---|
| 1 | MEK (100) | ○ | 80 | X | ⊚ |
| 2 | MC (100) | ○ | 39 | X | ⊚ |
| 3 | AC (100) | ○ | 56 | X | ⊚ |
| 4 | MA (100) | ○ | 56 | X | ⊚ |
| 5 | DOK (100) | ○ | 101 | X | ⊚ |
| 6 | CH (100) | ○ | 156 | X | ⊚ |
| 7 | DAA (100) | ○ | 168 | X | ⊚ |
| 8 | MT (100) | X | 65 | ⊚ | X |
| 9 | PR (100) | X | 97 | ⊚ | X |
| 10 | MIBK (100) | X | 116 | ⊚ | X |
| 11 | iBA (100) | X | 118 | ⊚ | X |
| 12 | OC (100) | X | 173 | ⊚ | X |

In the column of solubility, ○ means soluble and X means insoluble.

TABLE 2

| Sample of the Invention | Solvent Composition of Antiglare Hard Coat Layer (wt %) | Solubility of TAC of Solvent | Boiling Point (° C.) | Antiglare Property | Adhesion |
|---|---|---|---|---|---|
| 1 | CH/MIBK (30/70) | ○/X | 156/116 | ○ | ⊚ |
| 2 | DAA/MIBK (30/70) | ○/X | 168/116 | ○ | ⊚ |
| 3 | MEK/CH/MIBK (15/15/70) | ○/○/X | 80/156/116 | ○ | ⊚ |
| 4 | MA/MIBK (30/70) | ○/X | 56/116 | ⊚ | ⊚ |
| 5 | MEK/MIBK (30/70) | ○/X | 80/116 | ⊚ | ⊚ |
| 6 | MA/OC (30/70) | ○/X | 56/173 | ⊚° | ⊚ |
| 7 | MEK/OC (30/70) | ○/X | 80/173 | ⊚° | ⊚ |
| 8 | CH/OC (30/70) | ○/X | 156/173 | ⊚ | ⊚ |
| 9 | DAA/OC (30/70) | ○/X | 168/173 | ⊚ | ⊚ |
| 10 | MEK/MA/MIBK (15/15/70) | ○/○/X | 80/56/116 | ⊚ | ⊚ |
| 11 | MEK/CH/OC (15/15/70) | ○/○/X | 80/156/173 | ⊚ | ⊚ |
| 12 | MEK/MA/OC (15/15/70) | ○/○/X | 80/56/173 | ⊚° | ⊚ |

In the column of solubility, ○ means soluble and X means insoluble.
In the column of antiglare property, ⊚° is better than ⊚ by one rank.

The abbreviations in Tables 1 and 2 are as follows.
AC: Acetone
iBA: Isobutyl acetate
CH: Cyclohexanone
DAA: Diacetone alcohol
DOK: 1,4-Dioxane
MA: Methyl acetate
MC: Methylene chloride
MEK: Methyl ethyl ketone
MIBK: Methyl isobutyl ketone
MT: Methanol
OC: 2-Octanone
PR: 1-Propanol Sample Nos. 13 to 15 of the Invention As is shown in Table 3, antiglare antireflection film Sample Nos. 13, 14 and 15 of the invention were prepared in the same manner as in the preparation of Sample No. 7 of the present invention except that only the particle size of the polymer particles and the thickness of the antiglare hard coat layer were changed in such a manner that the ratio of the thickness of the antiglare hard coat layer to the average particle size of particles giving the antiglare property was kept constant (1.4/2.0=0.7) and the haze 12% as the antiglare antireflection film was not changed.

As is apparent from the results shown in Table 3, all of the samples of the present invention satisfy the required performances but the particle sizes of from 2 to 3 μmm are preferred in view of the transmission image clarity and the antiglare property.

TABLE 3

| Sample of the Invention | Thickness of Antiglare Layer (μm) | Particle Size (μm) | Antiglare Property | Adhesion | Transmission Image Clarity |
|---|---|---|---|---|---|
| 13 | 0.7 | 1.0 | ⊚ | ⊚ | 30 or more |
| (7) | (1.4) | (2.0) | (⊚°) | (⊚) | (30 or more) |
| 14 | 2.1 | 3.0 | ⊚° | ⊚ | 30 or more |
| 15 | 3.5 | 5.0 | ⊚° | ⊚ | 10 |

Sample Nos. 16 to 18 of the Invention

Antiglare antireflection film Sample Nos. 16, 17 and 18 of the invention were prepared in the same manner as in the preparation of Sample No. 7 of the invention except that the triacetyl cellulose support was replaced with the following triacetyl cellulose support I, II or III.

1. Preparation of Triacetyl Cellulose Support I

According to JP-A-11-254594, multilayer-casting was performed by means of a three layer co-casting die with the arrangement so that dope A was cast on both sides of dope B, and the dopes were discharged simultaneously on a metal drum, the cast film was peeled from the drum, and dried, thereby a three layer co-cast triacetyl cellulose film of 10 $\mu$m, 60 $\mu$m and 10 $\mu$m from the drum side was formed. Clear interfaces were not formed between each layer of the film.

2. Preparation of Triacetyl Cellulose Support II

According to JP-A-7-11055, the above-described triacetyl cellulose dope C was cast by single layer drum casting and triacetyl cellulose support II having a thickness of 80 $\mu$m was formed.

3. Preparation of Triacetyl Cellulose Support III

According to JP-A-7-11055, the above-described triacetyl cellulose dope D was cast by single layer drum casting and triacetyl cellulose support III having a thickness of 80 $\mu$m was formed.

When the displacement in the transverse direction of the film surface of each of the above triacetyl cellulose films I, II and III was measured according to the measuring method using the later-described laser displacement gauge, none of the samples had the height of the surface unevenness of from 3 to 10 mm pitch of 1/10,000 or more of the pitch.

Incidentally, when the displacement in the transverse direction of the film surface of TAC-TD80U was measured with the laser displacement gauge, the height of the surface unevenness of about 3 mm pitch was from 0.3 to 0.4 $\mu$m and a little unevenness was present.

Since Sample Nos. 16, 17 and 18 were excellent in the smoothness of the support, the coated state of the antiglare hard coat layer was still better than that of Sample No. 7 of the invention, thus an excellent antiglare antireflection film could be obtained. Other results of the evaluations were the same as those of Sample No. 7 of the invention.

In the next place, an antiglare antireflection polarizer was produced using an antiglare film having provided thereon an antireflection layer according to the present invention. When a liquid crystal display was manufactured using the above polarizer, since the reflection of an outer light was excluded, excellent contrast was obtained. Visibility and image clarity were excellent, because reflected images were inconspicuous due to the antiglare property.

While the invention has been described in detail and with reference to specific embodiments thereof, it will be apparent to one skilled in the art that various changes and modifications can be made therein without departing from the spirit and scope thereof.

What is claimed is:

1. An antiglare film comprising a triacetyl cellulose transparent support having provided thereon one or more hard coat layers including an antiglare hard coat layer, wherein the hard coat layer contiguous to said triacetyl cellulose transparent support is formed from a coating solution comprising solvents comprising one or more solvents which dissolve said triacetyl cellulose support and one or more solvents which do not dissolve said triacetyl cellulose support.

2. The antiglare film as claimed in claim 1, wherein at least one of the solvents which do not dissolve the triacetyl cellulose support has higher boiling point than the boiling point of at least one of the solvents which dissolve the triacetyl cellulose support.

3. The antiglare film as claimed in claim 2, wherein a temperature difference of the boiling point between the solvent having the highest boiling point of the solvents which do not dissolve the triacetyl cellulose support and the solvent having the highest boiling point of the solvents which dissolve the triacetyl cellulose support is 30° C. or more.

4. The antiglare film as claimed in claim 1, wherein the antiglare hard coat layer is formed by crosslinking by ionizing radiation.

5. The antiglare film as claimed in claim 1, wherein a penta-functional or more functional acrylate monomer which is crosslinked by ionizing radiation is at least used as the component for forming the antiglare hard coat layer.

6. The antiglare film as claimed in claim 1, wherein said triacetyl cellulose transparent support is a triacetyl cellulose film formed by casting a triacetyl cellulose dope prepared by dissolving a triacetyl cellulose in a solvent not substantially containing a dichloromethane by means of a single layer-casting process.

7. The antiglare film as claimed in claim 1, wherein said triacetyl cellulose transparent support is a triacetyl cellulose film formed by casting a triacetyl cellulose dope prepared by dissolving a triacetyl cellulose in a solvent by means of a multilayer-casting process.

8. The antiglare film as claimed in claim 1, wherein particles having an average particle size of from 1.0 to 5.0 $\mu$m are dispersed in the antiglare hard coat layer.

9. The antiglare film as claimed in claim 1, wherein said antiglare hard coat layer has a refractive index of from 1.50 to 2.00.

10. The antiglare film as claimed in claim 1, wherein a low refractive index layer having a refractive index of from 1.35 to 1.45 is provided as an antireflection layer as an outermost layer on the side of the support on which at least one hard coat layer is provided, and the haze value of the antiglare film is 3.0% or more.

11. A method for producing an antiglare film comprising a triacetyl cellulose transparent support having provided thereon one or more hard coat layers including an antiglare hard coat layer, wherein the hard coat layer contiguous to said triacetyl cellulose transparent support is formed from a coating solution comprising solvents comprising one or more solvents which dissolve said triacetyl cellulose support and one or more solvents which do not dissolve said triacetyl cellulose support.

12. The method for producing an antiglare film as claimed in claim 11, wherein at least one of the solvents which do not dissolve the triacetyl cellulose support has higher boiling point than the boiling point of at least one of the solvents which dissolve the triacetyl cellulose support.

13. The method for producing an antiglare film as claimed in claim 12, wherein a temperature difference of the boiling point between the solvent having the highest boiling point of the solvents which do not dissolve the triacetyl cellulose support and the solvent having the highest boiling point of the solvents which dissolve the triacetyl cellulose support is 30° C. or more.

14. The method for producing an antiglare film as claimed in claim 11, wherein the antiglare hard coat layer is formed by crosslinking by ionizing radiation.

15. The method for producing an antiglare film as claimed in claim 11, wherein a penta-functional or more functional acrylate monomer which is crosslinked by ionizing radiation is at least used as the component for forming the antiglare hard coat layer.

16. The method for producing an antiglare film as claimed in claim 11, wherein said triacetyl cellulose transparent support is a triacetyl cellulose film formed by casting a triacetyl cellulose dope prepared by dissolving a triacetyl cellulose in a solvent not substantially containing a dichloromethane by means of a single layer-casting process.

17. The method for producing an antiglare film as claimed in claim 11, wherein said triacetyl cellulose transparent support is a triacetyl cellulose film formed by casting a triacetyl cellulose dope prepared by dissolving a triacetyl cellulose in a solvent by means of a multilayer-casting process.

18. The method for producing an antiglare film as claimed in claim 11, wherein particles having an average particle size of from 1.0 to 5.0 μm are dispersed in the antiglare hard coat layer.

19. The method for producing an antiglare film as claimed in claim 11, wherein said antiglare hard coat layer has a refractive index of from 1.50 to 2.00.

20. A polarizer, wherein the antiglare film as claimed in claim 1 is used as at least one of two protective films of a polarizing layer.

21. A polarizer, wherein the antiglare film as claimed in claim 1 is used as one of two protective films of a polarizing layer and an optical compensating film having optical anisotropy is used as the other protective film.

22. A liquid crystal display, wherein the antiglare film as claimed in claim 1 is used as the outermost layer of the display.

23. A liquid crystal display, wherein the polarizer as claimed in claim 20 is used as the outermost layer of the display.

* * * * *